(12) United States Patent
Nakajima (10) Patent No.: US 10,027,832 B2
(45) Date of Patent: Jul. 17, 2018

(54) IMAGE READER DEVICE AND IMAGE FORMATION APPARATUS

(71) Applicant: Oki Data Corporation, Tokyo (JP)

(72) Inventor: Toru Nakajima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/404,541

(22) Filed: Jan. 12, 2017

(65) Prior Publication Data

US 2017/0230523 A1   Aug. 10, 2017

(30) Foreign Application Priority Data

Feb. 10, 2016   (JP) .................................. 2016-023449

(51) Int. Cl.
| | |
|---|---|
| H04N 1/04 | (2006.01) |
| H04N 1/00 | (2006.01) |
| H04N 1/40 | (2006.01) |
| H04N 1/12 | (2006.01) |
| H04N 1/10 | (2006.01) |

(52) U.S. Cl.
CPC ..... *H04N 1/00708* (2013.01); *H04N 1/00525* (2013.01); *H04N 1/00551* (2013.01); *H04N 1/00737* (2013.01); *H04N 1/00827* (2013.01); *H04N 1/04* (2013.01); *H04N 1/1061* (2013.01); *H04N 1/1225* (2013.01); *H04N 1/40056* (2013.01); *H04N 2201/0081* (2013.01)

(58) Field of Classification Search
CPC .. H04N 1/00708; H04N 1/00551; H04N 1/04; H04N 1/40056; H04N 1/1225; H04N 1/00525
USPC .................................................. 358/497, 474
See application file for complete search history.

(56) References Cited

U.S. PATENT DOCUMENTS

2007/0047023 A1*   3/2007   Oguri ................... H04N 1/0313
                                                                 358/474

FOREIGN PATENT DOCUMENTS

JP          2009-182949 A        8/2009

* cited by examiner

*Primary Examiner* — Houshang Safaipour
(74) *Attorney, Agent, or Firm* — Metrolexis Law Group, PLLC (57) ABSTRACT

An image reader device includes: an original placement part; a holder supporting the original placement part and forming, with the original placement part, a first boundary extending in a first direction; an image reading part movable in a vertical scan direction parallel to the first direction; and an open-close unit closable relative to the original placement part and including a press member which presses an original on the original placement part. The press member includes a first zone and a second zone arranged in the first direction. The first zone includes an extended portion extending beyond the first boundary from the original placement part to the holder when the open-close unit is located at a closed position.

17 Claims, 8 Drawing Sheets

IMAGE READER DEVICE AND IMAGE FORMATION APPARATUS

CROSS REFERENCE TO RELATED APPLICATIONS

This application claims priority based on 35 USC 119 from prior Japanese Patent Application No. 2016-023449 filed on Feb. 10, 2016, entitled "IMAGE READER DEVICE AND IMAGE FORMATION APPARATUS", the entire contents of which are incorporated herein by reference.

BACKGROUND OF THE INVENTION

1. Field of the Invention

This disclosure relates to an image reader device to read an image on an original, and an image formation apparatus provided with the image reader device.

2. Description of Related Art

A conventional image reader device, such as a copier and a scanner, includes: a platen provided with a contact glass plate on which to place an original in close contact in order to read the original; an image reading part disposed below the contact glass plate; an original press unit provided with a white original press sheet; and the like (see Patent Document 1: Japanese Patent Application Publication No. 2009-182949 (p. 7, FIG. 4), for example). The image reader device is configured to automatically detect an original size simultaneously with reading the original.

SUMMARY OF THE INVENTION

In order to detect the size of an original in a maximum size, the ends in an original size detectable region just need to be located between the ends of the original press sheet and the ends of the original in the maximum size placed on the contact glass plate if no restriction is imposed by a light transmission region of the contact glass plate. In practice, however, the light transmission region is determined by the size of the apparatus, and the positions of the ends of the original press sheet are restricted accordingly. Hence, it is difficult to set a sufficient distance between each end of the original press sheet and the corresponding end of the original in the maximum size. In the case where an original in the maximum size is a regular-size book or notebook that hardly remains constant when it is opened, an original having a significant production error, or the like, the ends of the original may be located outside the original size detectable region, and thus the original size may not be detected.

An aspect of the invention is an image reader device that includes: an original placement part on which an original is placed; a holder which supports the original placement part and forms a first boundary with the original placement part, the first boundary extending in a first direction; an image reading part which is disposed to be movable in a direction parallel to the first direction, and which reads an image on the original placed on the original placement part; and an open-close unit openable and closable relative to the original placement part and the holder, the open-close unit including a press member which presses the original placed on the original placement part. The press member includes a first zone and a second zone arranged in the first direction. The first zone includes an extended portion extending beyond the first boundary from the original placement part to the holder in the state where the open-close unit is located at a closed position. The second zone extends within the original placement part without extending beyond the first boundary to the holder in the state where the open-close unit is located at the closed position.

According to the aspect of the invention, the region of the original placement part can be fully utilized at the time of reading the size information on the original that is placed on the original placement part. Thus, the image reader device can deal with a variation in size of the original and contribute to downsizing of the apparatus.

DETAILED DESCRIPTION OF EMBODIMENTS

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Figure 1:
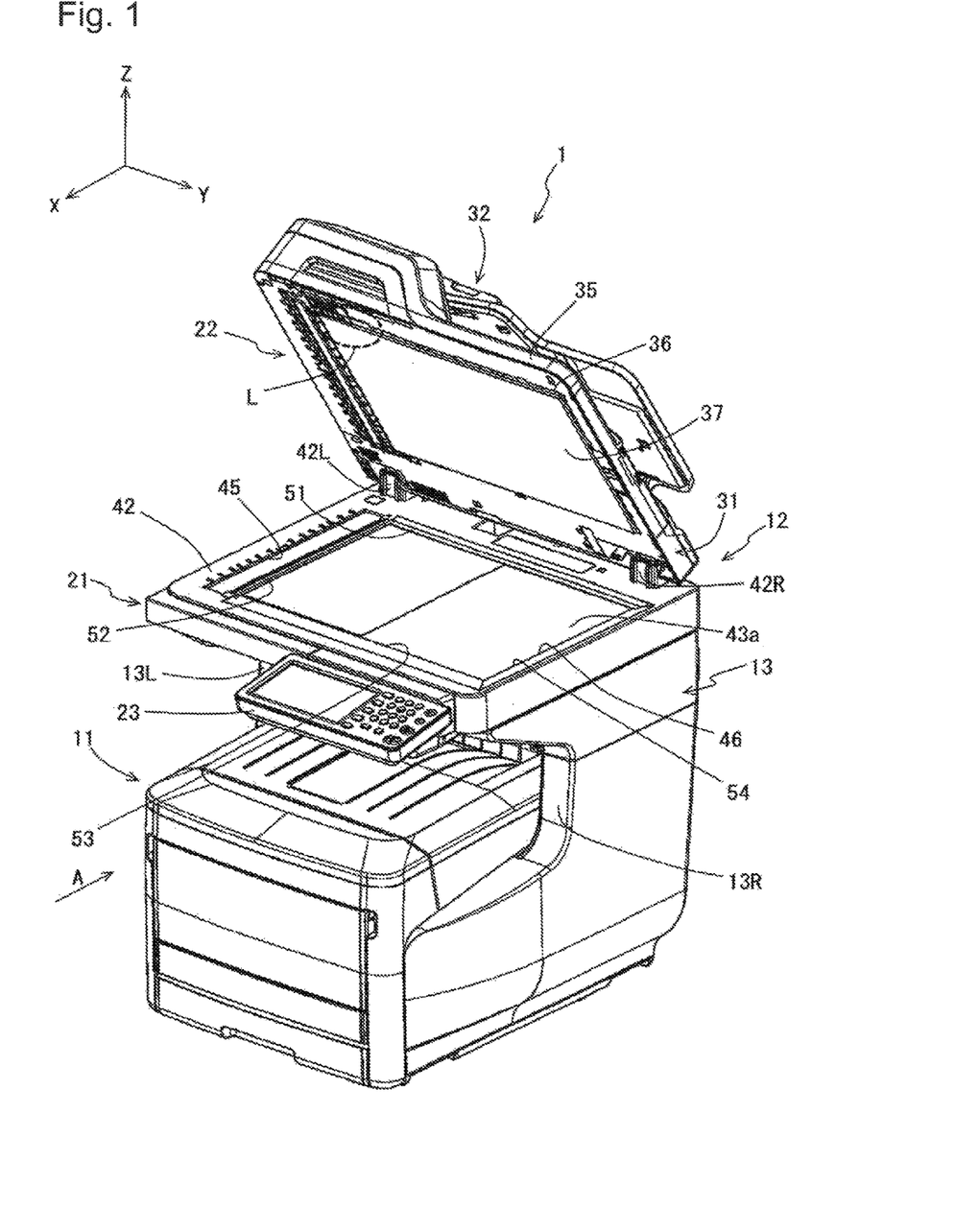
FIG. 1 is a perspective view illustrating external appearance of an image formation apparatus according to a first embodiment of the invention.
Figure 2:
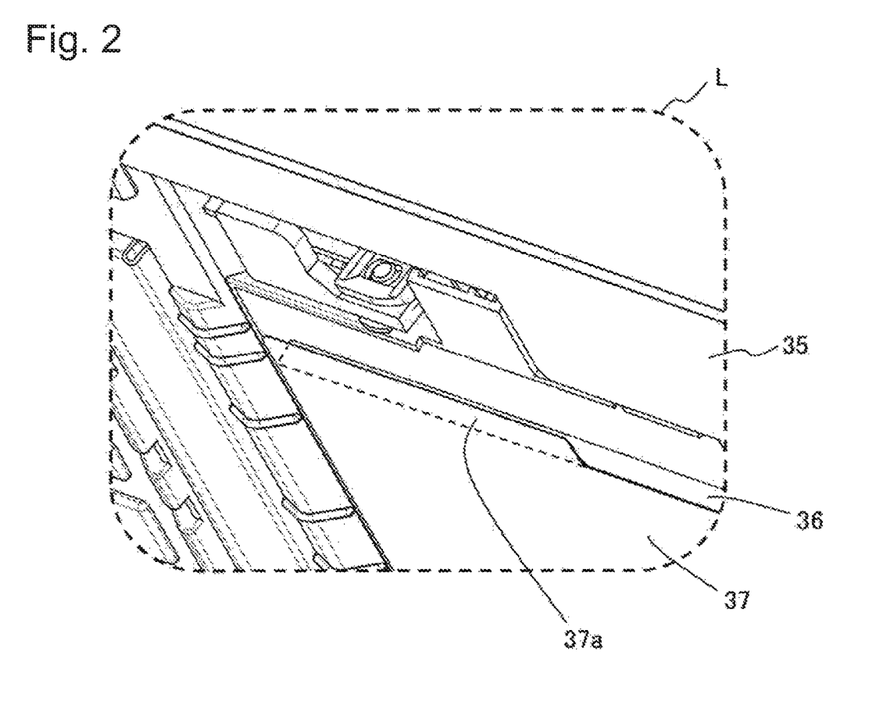
FIG. 2 is a partially enlarged view of a portion surrounded by a dashed line L in FIG. 1.

FIG. 1 is a perspective view illustrating external appearance of an image formation apparatus according to a first embodiment of the invention, and FIG. 2 is a partially enlarged view of a portion surrounded by a dashed line L in FIG. 1. Note that FIG. 1 illustrates a state where open-close unit 22 is located in a closed position to be described later.

As illustrated in FIG. 1, image formation apparatus 1 includes: image formation unit 11; image reader unit 12 or an image scanner unit disposed above image formation unit 11; and body frame 13 disposed in such a way as to straddle image formation unit 11 by using left and right supports 13L and 13R, thereby holding image reader unit 12 above image formation unit 11 and integrally joining image formation unit 11 and image reader unit 12 to each other. In the following description, up-down, right-left, and back-front directions of image formation apparatus 1 may be specified as appropriate from the viewpoint of a front face (a direction of an arrow A in FIG. 1) of image formation apparatus 1.

Image reader unit 12 includes: flat bed unit 21, open-close unit 22 turnably supported by flat bed unit 21; and operation unit 23 disposed at a front end of flat bed unit 21. Open-close unit 22 includes original press unit 31, and ADF (auto document feeder) 32 held by original press unit 31. Original press unit 31 includes press plate body 35, sponge member 36 as an elastic member fixed to a lower face of press plate body 35, and original press sheet 37 as a press member joined to a lower face of sponge member 36.

Flat bed unit 21 includes: original read sensor 41 (FIG. 3) as an image reading part or an image scanning part disposed in an internal space portion of flat bed unit 21 as described later; platen frame 42 being a housing or part of the housing and serving as a holder including first read opening 45 and second read opening 46 provided on an upper face of platen frame 42; and contact glass plate 43 (FIG. 3) attached to a lower face of platen frame 42 in such a way as to cover second read opening 46 from inside.

Figure 5A:
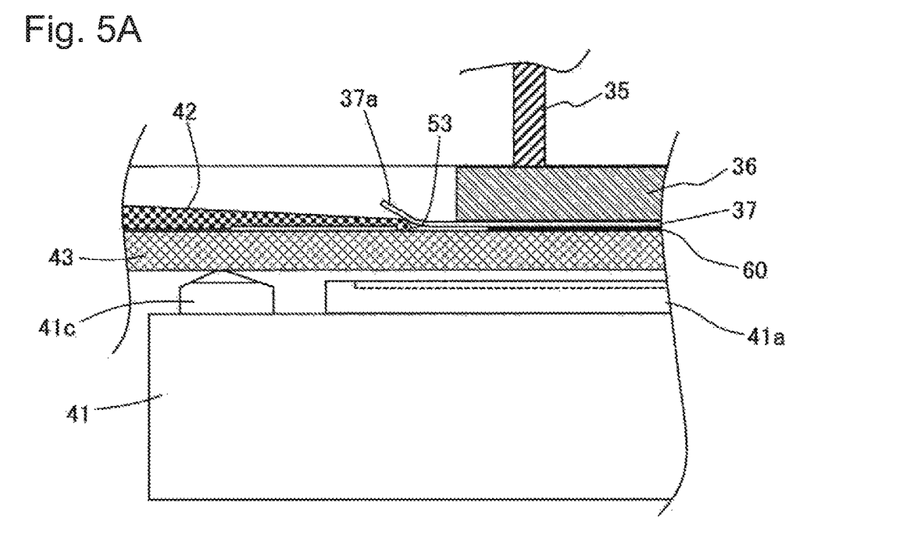
FIG. 5A is a partially enlarged view of a portion surrounded by a dashed line M in FIG. 4.
Figure 5B:
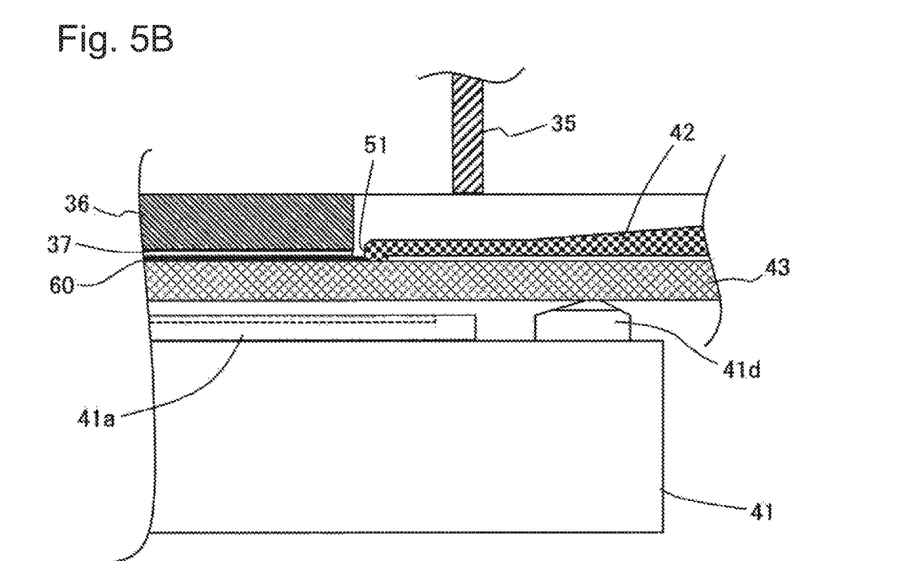
FIG. 5B is a partially enlarged view of a portion surrounded by a dashed line N in FIG. 4.

Original 60 (FIG. 5) is placed on a surface of contact glass plate 43. Here, as described later, original 60 in a maximum paper size of A3 is assumed to be read while being placed in a landscape orientation (placed vertically). Accordingly, second read opening 46 is formed laterally long, so that original 60 to be read in the paper size A3 can be placed on the surface of contact glass plate 43.

Left and right supports 42L and 42R to turnably support the open-close unit 22 are located near two ends on the back of platen frame 42, and pivotally support open-close unit 22 in such a way that a center line of a turning axis of open-close unit 22 is aligned with a longitudinal direction of second read opening 46.

Here, regarding X, Y, and Z axes in FIG. 1, the direction of the turning axis of open-close unit 22 is defined as the Y axis, a direction orthogonal to the Y axis and parallel to the surface of contact glass plate 43 is defined as the X axis, and a direction orthogonal to both of these axes is defined as the Z axis. Meanwhile, when the X, Y, and Z axes are indicated in other drawings to be described later, those axis directions are deemed to indicate the identical directions. In other words, the X, Y, and Z axes in the respective drawings represent layout directions at the time of constructing image formation apparatus 1 illustrated in FIG. 1. Here, image formation apparatus 1 is assumed to be installed while aligning the Z axis substantially with the vertical direction.

Figure 3:
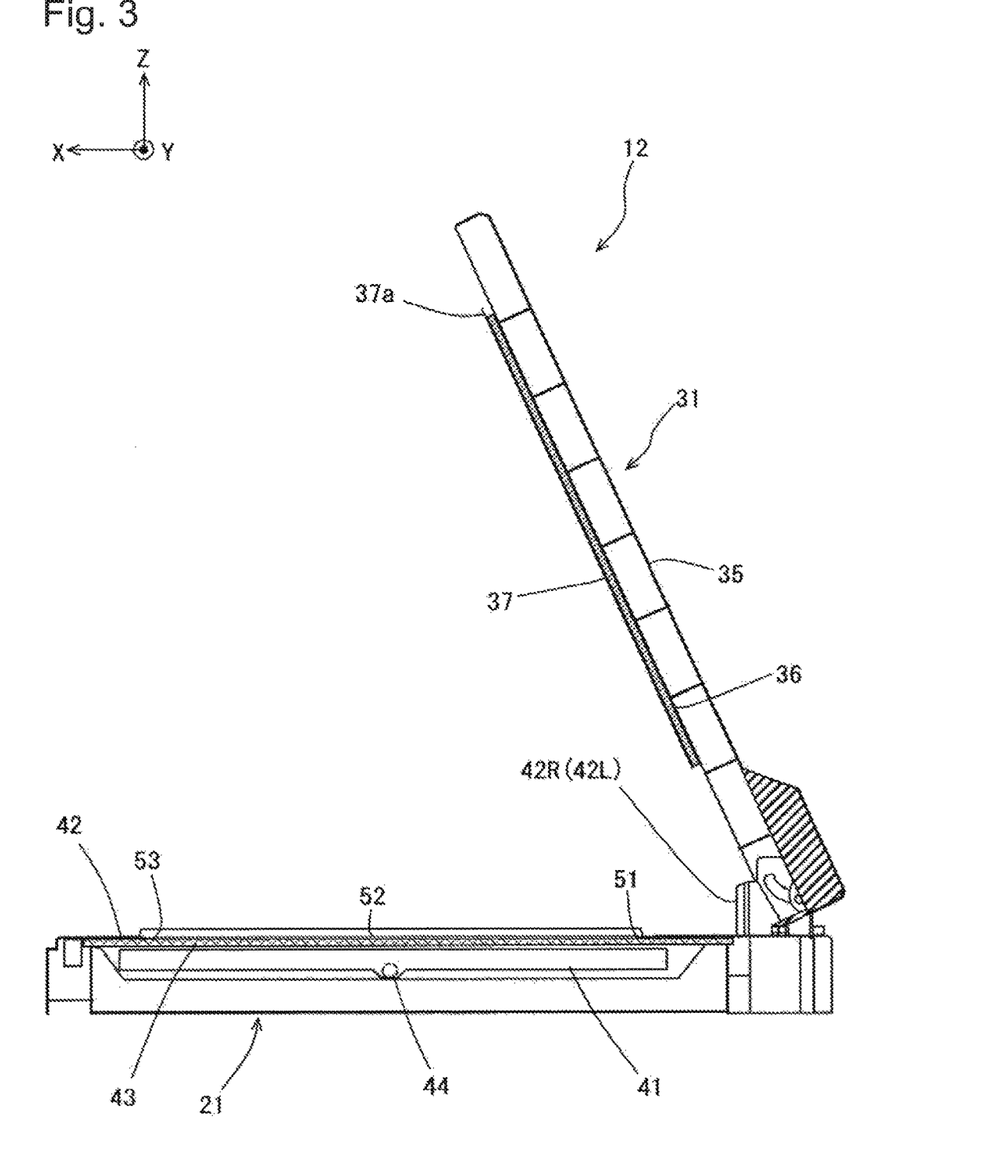
FIG. 3 is a configuration diagram of a part of only an image reader unit in FIG. 1 viewed from the right (a Y-axis positive direction).
Figure 4:
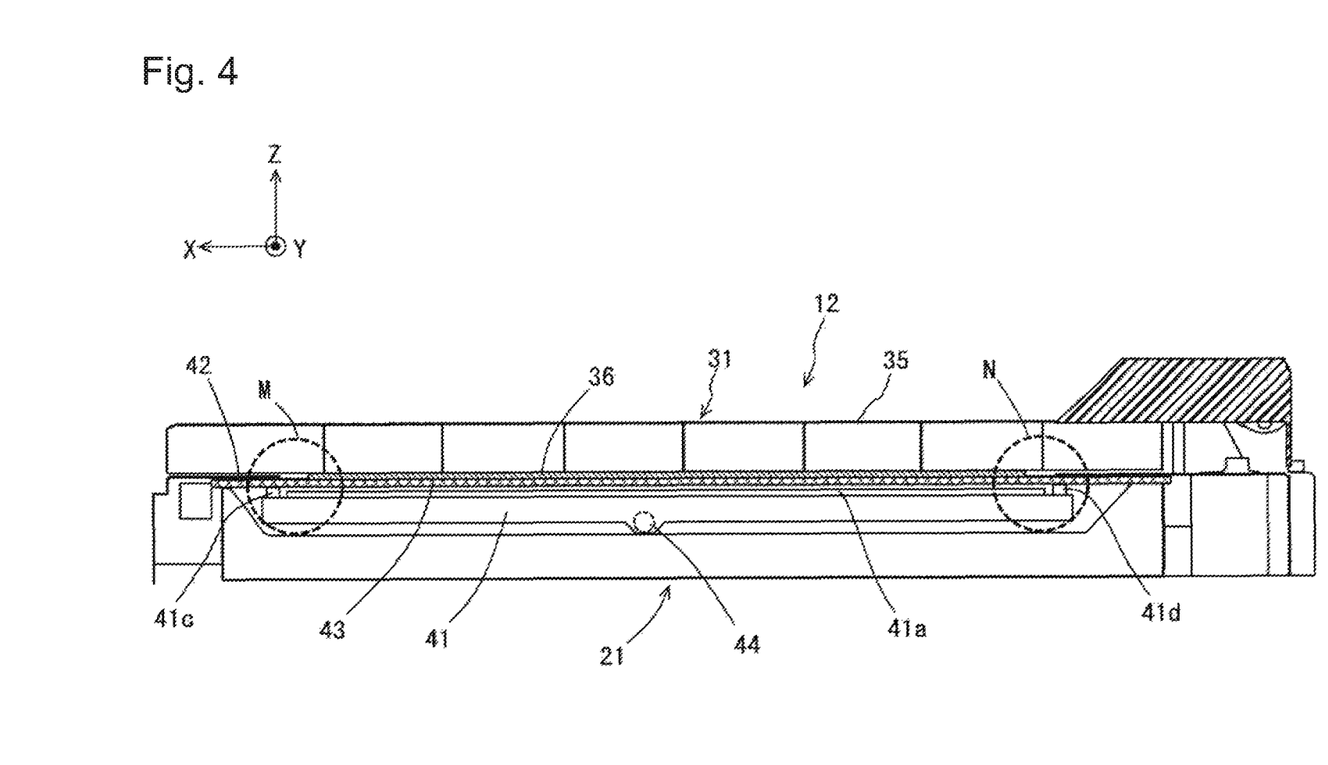
FIG. 4 is a configuration diagram of the part of the image reader unit illustrated in FIG. 3, which depicts a state where an open-close unit is located at a closed position.

FIG. 3 is a configuration diagram of a part of only image reader unit 12 in FIG. 1 viewed from the right (a Y-axis positive direction). FIG. 4 is a similar configuration diagram of the part, which depicts a state where open-close unit 22 is located at a closed position to be described later. Note that illustration of ADF 32 is omitted in FIGS. 3 and 4 for the sake of simplification. In the meantime, FIG. 5A is a partially enlarged view of a portion surrounded by a dashed line M in FIG. 4, and FIG. 5B is a partially enlarged view of a portion surrounded by a dashed line N in FIG. 4.

As illustrated in these drawings, original read sensor 41 extending in the X axis direction is disposed inside flat bed unit 21. Original read sensor 41 is held slidably in the Y axis direction (a vertical scan direction) by support guide 44 disposed below original read sensor 41 and extending in the Y axis direction. Moreover, guide projections 41c and 41d provided on two ends of original read sensor 41 come into contact with a lower surface of contact glass plate 43 and retain an attitude while original read sensor 41 is sliding.

On an upper part of original read sensor 41, there is provided sensor module 41a (FIG. 4), which is configured to read an image on original 60 that is placed on contact glass plate 43, for example, line by line in a main scan direction by using light emission elements and photodetectors respectively arranged in the X axis direction (the main scan direction).

Original 60 is set on contact glass plate 43 that covers second read opening 46 in such away that a surface of original 60 to be read is put face-down. Here, positioning guides for guiding a set position are formed at second read opening 46 of platen frame 42.

Specifically, as illustrated in FIG. 5B, first positioning guide 51 having a contact portion formed substantially perpendicular to the upper surface of contact glass plate 43 is formed at a rear long side portion of second read opening 46. Likewise, second positioning guide 52 having a contact portion formed substantially perpendicular to the upper surface of contact glass plate 43 is formed at a left short side portion of second read opening 46. Upon reading (scanning) the original on contact grass plate 43, original 60 is supposed to be abut both of first and second positioning guides 51 and 52. That is, the intersection between first and second positioning guides 51 and 52 is an original placement reference point Rf. See, FIG. 6.

First step portion 53 (or a third positioning guide) and second step portion 54 (or a fourth positioning guide), which serve as rims between platen frame 42 and the upper surface of contact glass plate 43, are formed at portions of platen frame 42 located at a front long side portion and a right short side portion of second read opening 46, respectively.

Here, a boundary in the main scan direction between first step portion 53 and contact glass plate 43 corresponds to a first boundary. A boundary in the vertical scan direction between second positioning guide 52 and contact glass plate 43 corresponds to a second boundary. A boundary in the main scan direction between first positioning guide 51 and contact glass plate 43 corresponds to a third boundary. In the meantime, a region of contact glass plate 43 that covers second read opening and enables placement of original 60 thereon may be hereinafter referred to as original placement surface 43a serving as an original placement part when appropriate.

Hence, when an operator sets original 60 on contact glass plate 43, the operator positions original 60 by bringing the rear and left sides of original 60 into contact with first positioning guide 51 and second positioning guide 52 of platen frame 42, respectively.

In the meantime, press plate body 35 of open-close unit 22 is provided with original press sheet 37 at a position to be opposed to contact glass plate 43 when open-close unit 22 is located at the closed position. Original press sheet 37 is fixed to press plate body 35 through sponge member 36. Accordingly, as illustrated in FIG. 4, when open-close unit 22 is located at the closed position, original press sheet 37 substantially uniformly biases original 60 (FIG. 5), which is set on original placement surface 43a of contact glass plate 43, toward original placement surface 43a by use of a weight of open-close unit 22, elasticity of sponge member 36, and the like. Hence, original 60 comes into close contact with contact glass plate 43.

Open-close detector 103 (illustrated only in FIG. 7) to detect whether open-close unit 22 is located at an open position as illustrated in FIG. 3 or at the closed position as illustrated in FIG. 4 is disposed in the vicinity of any of supports 42L and 42R.

Figure 6:
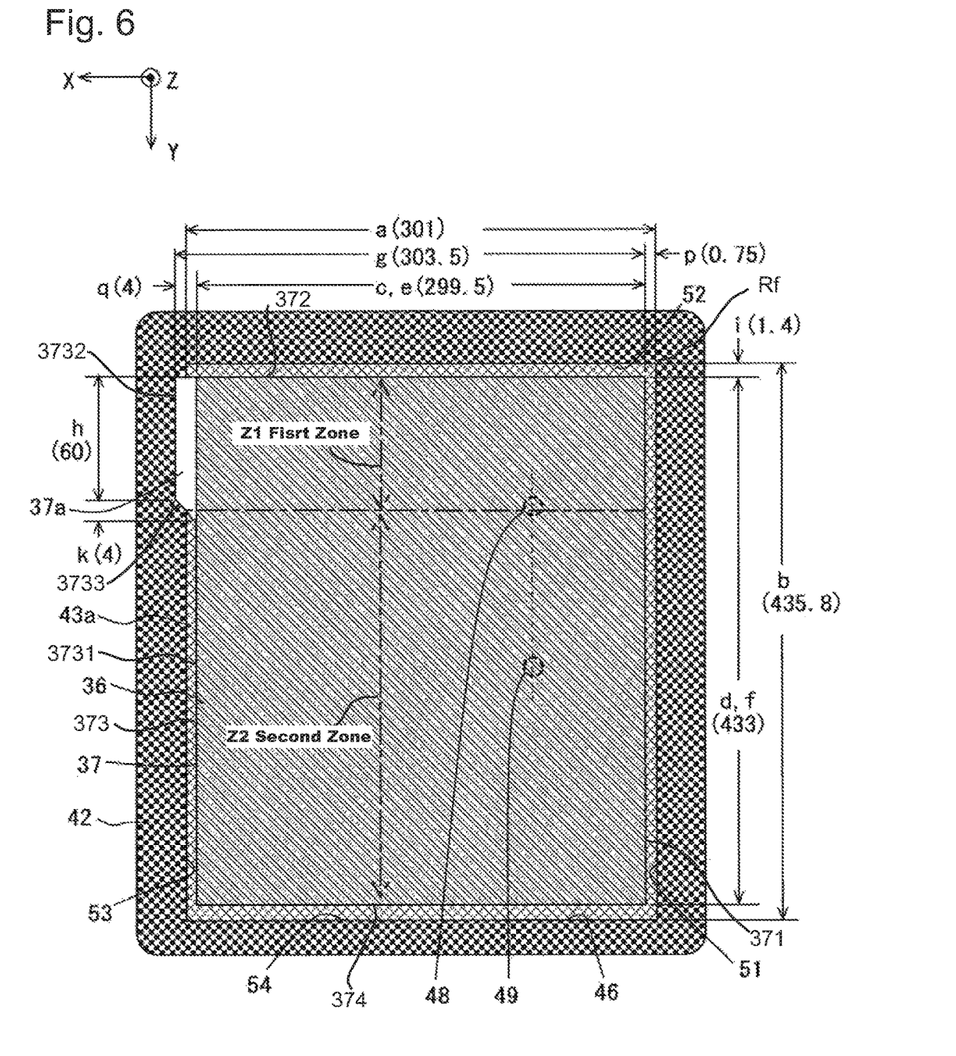
FIG. 6 is a dimensional plan view which illustrates layout relations and dimensions of an original placement surface of a contact glass plate, an original press sheet, and a sponge member when the open-close unit is located at the closed position.

FIG. 6 is a dimensional plan view which illustrates layout relations and dimensions of original placement surface 43a of contact glass plate 43 that covers second read opening 46, original press sheet 37, and sponge member 36.

As illustrated in FIG. 6, with respect to original placement surface 43a of contact glass plate 43 covering second read opening 46, the shape and an attachment position of sponge member 36 are determined in such a way that sponge member 36 remains within the placement surface, i.e., that the laterally long external shape of sponge member 36 is substantially similar to and smaller than the shape of second read opening 46, and such that sponge member 36 is kept from protruding from the opening.

Meanwhile, original press sheet 37 is formed in the same size as outer dimensions of sponge member 36 except for projection 37a. Original press sheet 37 includes: first side 371 opposed to first positioning guide 51; second side 372 opposed to second positioning guide 52; third side 373 opposed to first step portion 53; and fourth side 374 opposed to the second step portion 54. Projection 37a of original press sheet 37 is formed at third side 373 of original press sheet 37 in the vicinity of a left end portion (second side 373). That is, projection 37a projects from the rest of third side 373 of original press sheet 37 and extends beyond first step portion 53 to reach reaches platen frame 42 (see FIG. 2 and FIG. 6). Third side 373 of original press sheet 37 includes: inclined portion 373 inclined with respect to first step portion 53 (the first boundary) and extending across first step portion 53 (the first boundary); and two parallel portions extending parallel to first step portion 53 (the first boundary) such that inclined portion 373 is provided between and connects the two parallel portions 3731 and 3732. First parallel portion 3731 extends within an area above original placement surface 43a, while second parallel portion 3732 extends within an area above platen frame 42 (see FIG. 6).

Now, a description is given of the shape (which corresponds to the opening shape of second read opening 46) of original placement surface 43a of contact glass plate 43 covering second read opening 46, and examples of the dimensions of sponge member 36 and original press sheet 37.

As described previously, in image reader unit 12, original 60 to be read in the maximum paper size of A3 is assumed to be read while being placed in the landscape orientation (placed vertically) on original placement surface 43a of contact glass plate 43 covering second read opening 46. For this reason, a length a in a lateral direction (X direction) of original placement surface 43a is set to 301 mm while a length in a longitudinal direction (Y direction) thereof is set to 435.8 mm. Lengths c and e in the lateral direction of sponge member 36 and original press sheet 37 exclusive of projection 37a are set to 299.5 mm, and lengths d and f in the longitudinal direction thereof are set to 433 mm. Each clearance i in the longitudinal direction between an original placement surface end portion and each of sponge member 36 and original press sheet 37 is set to 1.4 mm, and each clearance p in the lateral direction between an original placement surface end portion and each of sponge member 36 and original press sheet 37 exclusive of projection 37a is set to 0.75 mm. Further, a projection width q of projection 37a of original press sheet 37 is set to 4 mm, a width h of its front end portion (second parallel portion 3732) is set to 60 mm, and a width k in the longitudinal direction of a chamfer portion (inclined portion 3733) formed at projection 37a is set to 4 mm.

As a consequence, projection 37a has a part (an extended portion) that extends beyond first step portion 53 from original placement surface 43a to reach platen frame 42 when open-close unit 22 is located at the closed position, as illustrated in FIG. 5A. Specifically, a large part in a width of at least 60 mm of projection 37a protrudes from original placement surface 43a when open-close unit 22 is located at the closed position, and reaches platen frame 42 while extending beyond first step portion 53 as illustrated in FIG. 5A. Original press sheet 37 is formed from an elastic sheet-like member. Moreover, projection 37a having the limited width h of its front end portion (second parallel portion 3732) is provided alone without being supported by sponge member 36, so that projection 37a can be easily warped if brought into contact with first step portion 53 as illustrated in FIG. 5A. Thus, it is possible to avoid loss of close contact between original press sheet 37 and contact glass plate 43.

Inside flat bed unit 21, first sheet sensor 48 and second sheet sensor 49 are arranged at different positions in the vertical scan direction (the Y axis direction) illustrated in FIG. 6, with which it is determined whether the original placed on contact glass plate 43 is placed vertically (arrangement in which the short side is aligned with the main scan direction (the X axis direction)) or placed horizontally (arrangement in which the long side is aligned with the main scan direction (the X axis direction)).

Figure 7:
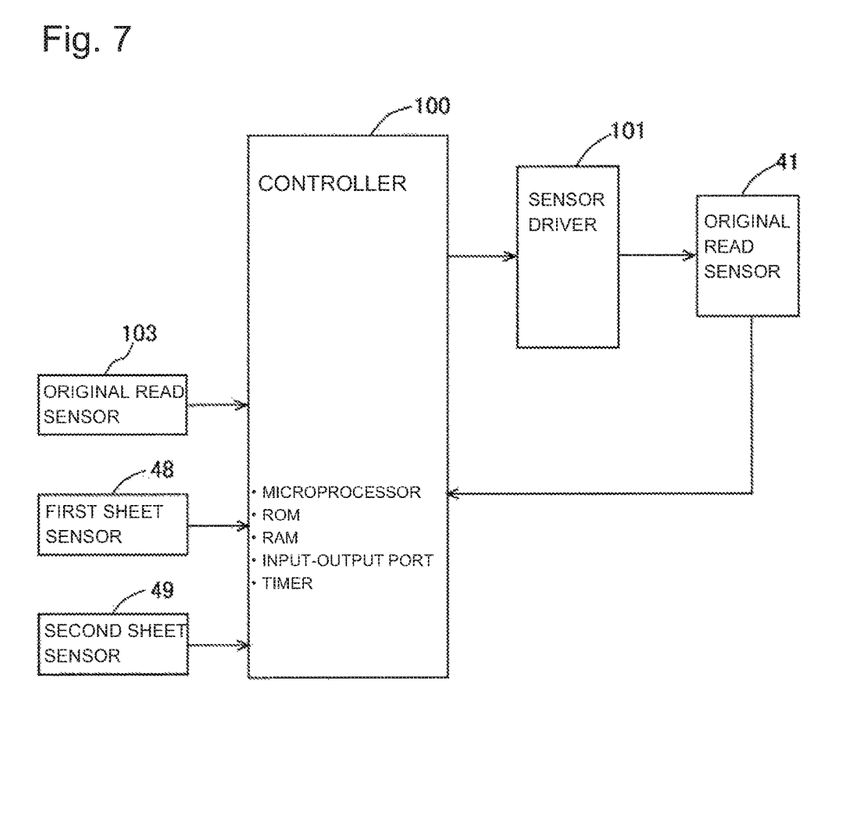
FIG. 7 is a block diagram illustrating a configuration of apart of a drive control system for an original size reading operation by the image reader unit mainly according to the invention.
Figure 8:
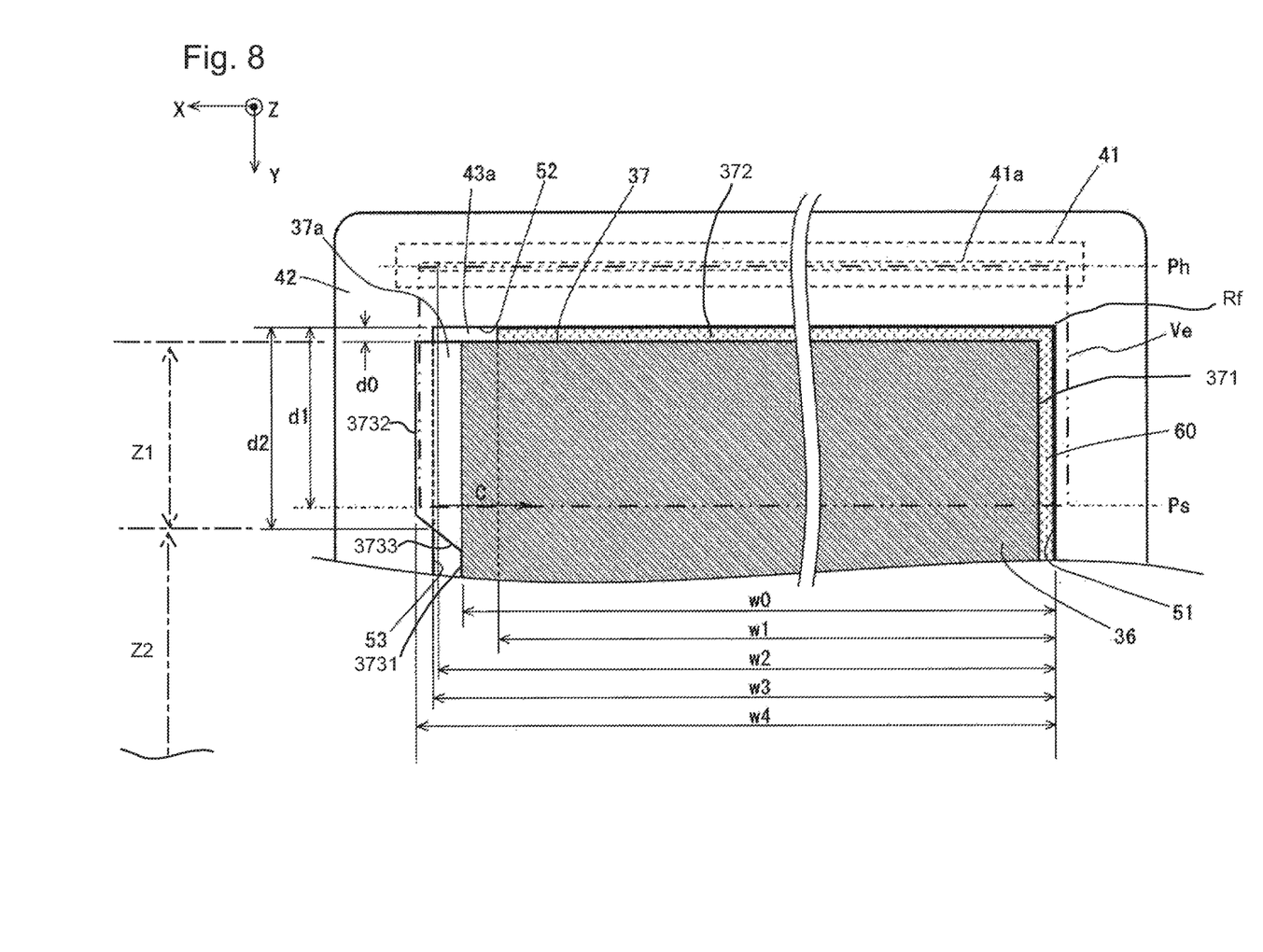
FIG. 8 is a diagram for explaining the original size reading operation by the image reader unit.

FIG. 7 is a block diagram illustrating a configuration of apart of a drive control system for an original size reading operation by image reader unit 12 mainly according to the invention. FIG. 8 is a diagram for explaining the original size reading operation by image reader unit 12.

In FIG. 7, open-close detector 103 detects a state where open-close unit 22 is located at the open position as illustrated in FIG. 3 and a state where open-close unit 22 is located at the closed position as illustrated in FIG. 4, and sends controller 100 open-close detection information that indicates any of the states. Each of first sheet sensor 48 and second sheet sensor 49, which are arranged at the different positions in the vertical scan direction (the Y axis direction) within the region of original placement surface 43a of contact glass plate 43 as illustrated in FIG. 6, individually sends controller 100 information indicating whether or not the original is detected at the corresponding position.

Controller 100 is formed from a microprocessor, a ROM, a RAM, an input-output port, a timer, and the like. Controller 100 receives open-close information on open-close unit 22 from open-close detector 103, original detection information from each of first and second sheet sensors 48 and 49, and the like, then performs sequence control of the entirety of image reader unit 12, and executes an operation to read the original size.

In accordance with instructions from controller 100, sensor driver 101 moves original read sensor 41 in the vertical scan direction and executes data reading in the main scan direction by using sensor module 41a. Original read sensor 41 sends controller 100 readout data read by original read sensor 41. Note that controller 100 and sensor driver 101 collectively correspond to a drive controller.

A method of reading the original size by controller 100 is further described with reference to FIG. 8.

FIG. 8 is a plan view schematically illustrating positional relations among original placement surface 43a of contact glass plate 43, original 60, original press sheet 37, sponge member 36, and original read sensor 41 in the vicinity of second positioning guide 52 in the state where original 60 to be read is set at a predetermined position and open-close unit 22 is closed.

In FIG. 8, original read sensor 41 to move slidably in the vertical scan direction (the Y axis direction) is located at a home position Ph in the vicinity of a left end portion of flat bed unit 21 (FIG. 1). Note that the home position Ph mentioned here indicates a position in the vertical scan direction of sensor module 41*a* of original read sensor 41, which reads one line in the main scan direction (the X axis direction). Likewise, when a position in the vertical direction of original read sensor 41 is hereinbelow indicated, such a position represents the position of sensor module 41*a*.

In the meantime, a distance w1 indicates a distance from first positioning guide 51 to a front end portion of original 60 to be placed. A distance w2 indicates a distance of a detection start position from first positioning guide 51, the detection start position being applicable to a case of detecting the front end portion of original 60 as described later. A distance w3 indicates a distance of first step portion 53 from first positioning guide 51 (which corresponds to the length a in the lateral direction of original placement surface 43*a* of contact glass plate 43). A distance w4 indicates a distance from first positioning guide 51 to the front end portion of projection 37*a* of original press sheet 37.

When an operator sets original 60 on original placement surface 43*a* of contact glass plate 43, the operator first turns open-close unit 22 (FIG. 1) to the open position, and positions and sets prepared original 60 by butting the respective sides of original 60 against first positioning guide 51 and second positioning guide 52 opposed thereto.

Accordingly, controller 100 monitors the open-close detection information received from open-close detector 103, and the original detection information received from first and second sheet sensors 48 and 49. When controller 100 detects a state where open-close unit 22 (FIG. 1) is located at the open position without setting original 60, controller 100 determines that original 60 is to be set later, and instructs sensor driver 101 to move original read sensor 41 to a read movement start position Ps (a first predetermined position). Upon receipt of the instruction, sensor driver 101 moves original read sensor 41 from the home position Ph to the read movement start position Ps.

Next, when controller 100 detects a state where open-close unit 22 (FIG. 1) is closed while original 60 is set on original placement surface 43*a* of contact glass plate 43, controller 100 starts reading the size of set original 60.

First, controller 100 controls original read sensor 41 through sensor driver 101, causes sensor module 41*a* to perform scanning sequentially in the main scan direction while moving from the read movement start position Ps to the home position Ph in the vertical scan direction, reads an image in a read region Ve surrounded by a chain double dashed line in FIG. 8, receives read image data from original read sensor 41, and temporarily stores the image data in a storage unit such as the RAM.

Thereafter, by means of software processing and based on the image information in the read region Ve, controller 100 performs line scan in order to detect the front end portion of original 60 by sequentially reading the image data corresponding to positions on the same line in the main scan direction from the position at the distance w2 indicated in FIG. 8 toward first positioning guide 51 indicated with an arrow C. Thus, controller 100 detects the distance w1 from first positioning guide 51, i.e., the size in the main scan direction of original 60.

It is also possible to perform this line scan at multiple positions in the vertical scan direction, and to calculate an average value of the distances w1 detected at the respective positions. Alternatively, the front end portion of original 60 can be detected by evaluating a shadow that is cast in a space between original press sheet 37 as a background and the front end portion of original 60, for example.

Accordingly, a distance d1 from second positioning guide 52 where the line scan takes place is set in a first zone Z1 shorter than a distance d2 from second positioning guide 52 to a point where projection 37*a* of original press sheet 37 extends beyond first step portion 53, and longer than a distance d0 from second positioning guide 52 to the end of original press sheet 37, i.e., so as to satisfy $$d2>d1>d0 \qquad (1).$$

Here, the above-mentioned distances w1 to w4 from second positioning guide 52 satisfy a relation of $$w4>w3>w2>w \qquad (2\text{-}1).$$

Note that a range beyond the distance d2 in the Y direction corresponds to a second zone Z2.

However, this configuration assumes detection of an original in paper size B5 (182 mm by 257 mm) and in a landscape orientation as the smallest size. Accordingly, the distance d2 needs to be set shorter than 182 mm, which is the size in the lateral direction of a sheet in paper size B5. Here, as illustrated in FIG. 5A, it is preferable to form projection 37*a* so as to be warped easily. For this reason, in this case it is recommended to set the first zone Z1 from the distances d0 to d2 in a range of 10% to 30% of the length d (433 mm) in the longitudinal direction of original press sheet 37.

In the meantime, if the detection of the front end portion of original 60 by the software processing is feasible without being confused by data transition at first step portion 53, then it is also possible to establish the relation among the distances w1 to w4 as $$w4>w2>w3>w1 \qquad (2\text{-}2).$$

In this embodiment, the read region Ve is set in the range illustrated in FIG. 8. However, the invention is not limited to the foregoing. The read region Ve can be set within any image read range which satisfies the above-mentioned formulae, and from which the image data that enables the detection of the front end portion of original 60 is available.

Controller 100 specifies the paper size and a placement direction of original 60 set on original placement surface 43*a* of contact glass plate 43 by using the detected distance w1 and the original detection information from first sheet sensor 48 and second sheet sensor 49.

For example, if the distance w1 is 297 mm and both first sheet sensor 48 and second sheet sensor 49 detect a sheet, then controller 100 determines that the set original is a sheet in paper size A3 which is placed vertically. Meanwhile, if the distance w1 is 297 mm and only first sheet sensor 48 detects a sheet, then controller 100 determines that the set original is a sheet in paper size A4 which is placed horizontally. In this way, controller 100 can determine paper sizes B5 (vertical and horizontal), A4 (vertical and horizontal), B4 (vertical), and A3 (vertical), for example.

Note that this embodiment describes the method of reading the image in the read region Ve surrounded by the chain double dashed line in FIG. 8 and temporarily storing the image data in the storage unit in the course of the original size reading operation, and then specifying the paper size of the original based on the stored image data. However, the invention is not limited to this method. For example, the front end portion of original 60 may be detected by directly analyzing the image data on the same line in the main scan direction toward first positioning guide 51 indicated with the arrow C, starting from a position at the distance w2 illustrated in FIG. 8.

Meanwhile, in this embodiment, open-close unit 22 is configured to be turned around the turning axis which is located on the back of platen frame 42 and extends in the vertical scan direction. Here, various other modes are also applicable. For example, open-close unit 22 may be turned around a turning axis, which is located at an end on the right or left of open-close unit 22 and extends in the main scan direction.

As described above, according to image reader unit 12 of this embodiment, projection 37a of original press sheet 37 is formed to overlap platen frame 42 while extending beyond first step portion 53 in the first zone Z1 from the distance d0 to the distance d2 in the vertical scan direction as illustrated in FIG. 8. Thus, by performing the line scan in this first zone Z1 and detecting the front end portion of original 60, a sheet detectable region in the main scan direction can be expanded to the distance w3 at the maximum.

Incidentally, if projection 37a of original press sheet 37 is not formed, then the sheet detectable region in the main scan direction is defined on the basis of the distance w0. Here, the distance w0 is a distance of a front end portion of sponge member 36, which has the same external shape as that of original press sheet 37 without projection 37a, from first positioning guide 51. As a consequence, the sheet detectable region in the main scan direction is limited in this case.

Hence, according to image reader unit 12 of this embodiment, the sheet detectable region in the main scan direction can be expanded to the maximum to the end portion of second read opening 46 by providing original press sheet 37 with projection 37a. Moreover, since the paper size can be determined by effectively using original placement surface 43a to the maximum extent possible. Thus, this configuration can also contribute to downsizing of the apparatus since the original placement surface does not have to be expanded more than necessary.

Furthermore, in original press sheet 37, projection 37a formed from the elastic sheet-like member and having the limited width h of its front end portion is provided alone without being supported by sponge member 36. Accordingly, projection 37a can be easily warped in case projection 37a is brought into contact with first step portion 53 illustrated in FIG. 5A. Thus, it is possible to avoid the loss of close contact between original press sheet 37 and contact glass plate 43.

Meanwhile, it is to be noted that the terms such as "on", "below", "left", "right", "front", and "back" in the above-described embodiment are used for the sake of convenience and are not intended to restrict definite positional relations in a state of arrangement of the image formation apparatus.

Although the embodiment describes the example of applying the invention to an image reader device, the invention is not limited only to this application. The invention is also applicable to other apparatuses including a multi-functional printer (MFP), a facsimile, a copier, and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image reader device comprising:
   an original placement part on which an original is placed;
   a holder which supports the original placement part and forms a first boundary with the original placement part, the first boundary extending in a first direction;
   an image reading part which is disposed to be movable in a direction parallel to the first direction, and which reads an image on the original placed on the original placement part; and
   an open-close unit openable and closable relative to the original placement part and the holder, the open-close unit including a press member which presses the original placed on the original placement part, wherein
   the press member includes a first zone and a second zone arranged in the first direction,
   the first zone includes an extended portion that extends beyond the first boundary in a second direction from the original placement part to the holder in a state where the open-close unit is located at a closed position, the second direction orthogonal to the first direction, and
   the second zone extends within the original placement part without extending beyond the first boundary in the second direction, to the holder in the state where the open-close unit is located at the closed position.

2. The image reader device according to claim 1, wherein
   the holder forms a second boundary with the original placement part, the second boundary extending in the second direction orthogonal to the first direction and intersecting with the first boundary, and
   the holder forms a third boundary with the original placement part, the third boundary parallel to the first boundary and intersecting with the second boundary interposed between the first and second boundaries.

3. The image reader device according to claim 2, wherein, the first zone is closer to the second boundary than the second zone.

4. The image reader device according to claim 3, wherein the press member includes no portion extending in the second direction beyond the second boundary from the original placement part to the holder in the state where the open-close unit is located at the closed position.

5. The image reader device according to claim 3, wherein the press member includes no portion extending in the first direction beyond the third boundary from the original placement part to the holder in the state where the open-close unit is located at the closed position.

6. The image reader device according to claim 3, wherein the holder includes guides which are formed along the second boundary and the third boundary and which guide the original on the original placement part.

7. The image reader device according to claim 3, further comprising:
   a drive controller which performs drive control of movement and image reading of the image reading part, wherein
   the drive controller detects size information on the original on the original placement part by reading with the image reading part while moving the image reading part, in the first direction as a vertical scan direction, from a first predetermined position within the original placement part toward the second boundary.

8. The image reader device according to claim 3, further comprising:
   a drive controller which performs drive control of movement and image reading of the image reading part, wherein
   the drive controller moves the image reading part in the first direction from a standby position outside the original placement part across the second boundary to a first predetermined position within the original placement part, and then detects size information on the original on the original placement part by reading with the image reading part while moving the image reading part, in the first direction as a vertical scan direction, from the first predetermined position within the original placement part toward the second boundary.

9. The image reader device according to claim 7, wherein the first predetermined position is a position within the first zone of the press member in the first direction.

10. The image reader device according to claim 9, wherein the image reading part at the first predetermined position in the first direction starts reading from a second predetermined position toward the third boundary in the second direction as a main scanning direction, the second predetermined position adjacent to the first boundary within the original placement part.

11. The image reader device according to claim 1, wherein the open-close unit includes an original press unit including the press member and an elastic member which holds the press member.

12. The image reader device according to claim 11, wherein
the press member is formed of a flexible material, and
the elastic member is not provided at least at an area corresponding to the extended portion in the first zone such that the extended portion of the press member is deformable without restriction of the elastic member.

13. The image reader device according to claim 1, wherein the press member includes a side that is close to the first boundary, the side including an inclined portion inclined with respect to the first boundary while extending from the first zone to the second zone and two parallel portions extending parallel to the first boundary such that the inclined portion is provided between and connects the two parallel portions.

14. The image reader device according to claim 13, wherein in the state where the open-close unit is located at the closed position, one of the parallel portions extends within an area above the original placement part, the other parallel portion extends within an area above the holder, and the inclined portion extends across the first boundary.

15. An image formation apparatus comprising the image reader device according to claim 1.

16. An image reader device comprising:
an original placement part on which an original is placed;
a holder which supports the original placement part and forms a first boundary, a second boundary, and a third boundary with the original placement part, the first boundary extending in a first direction, the second boundary extending in a second direction orthogonal to the first direction and intersecting with the first boundary, the third boundary parallel to the first boundary and intersecting with the second boundary interposed between the first and second boundaries;
an image reading part which is disposed to be movable in a direction parallel to the first direction, and which reads an image on the original placed on the original placement part; and
an open-close unit openable and closable relative to the original placement part and the holder, the open-close unit including a press member which presses the original placed on the original placement part, wherein
the press member includes a first zone and a second zone arranged in the first direction,
the first zone includes an extended portion that extends beyond the first boundary from the original placement part to the holder in a state where the open-close unit is located at a closed position,
the second zone extends within the original placement part without extending beyond the first boundary to the holder in the state where the open-close unit is located at the closed position, and
the first zone is closer to the second boundary than the second zone.

17. An image reader device comprising:
an original placement part on which an original is placed;
a holder which supports the original placement part and forms a first boundary with the original placement part, the first boundary extending in a first direction;
an image reading part which is disposed to be movable in a direction parallel to the first direction, and which reads an image on the original placed on the original placement part; and
an open-close unit openable and closable relative to the original placement part and the holder, the open-close unit including a press member which presses the original placed on the original placement part, wherein
the press member includes a first zone and a second zone arranged in the first direction,
the first zone includes an extended portion that extends beyond the first boundary from the original placement part to the holder in a state where the open-close unit is located at a closed position, and
the second zone extends within the original placement part without extending beyond the first boundary to the holder in the state where the open-close unit is located at the closed position, and
the press member includes a side that is close to the first boundary, the side including an inclined portion inclined with respect to the first boundary while extending from the first zone to the second zone and two parallel portions extending parallel to the first boundary such that the inclined portion is provided between and connects the two parallel portions.

* * * * *